United States Patent
Kuo et al.

(10) Patent No.: US 9,217,823 B2
(45) Date of Patent: Dec. 22, 2015

(54) LIGHT-EMITTING-DIODE LIGHT BAR AND RELATED PLANAR LIGHT SOURCE

(71) Applicants: Chin-Piao Kuo, Pao Shan Hsiang (TW); Pei-Jie Tsai, Pao Shan Hsiang (TW)

(72) Inventors: Chin-Piao Kuo, Pao Shan Hsiang (TW); Pei-Jie Tsai, Pao Shan Hsiang (TW)

( * ) Notice: Subject to any disclaimer, the term of this patent is extended or adjusted under 35 U.S.C. 154(b) by 0 days.

(21) Appl. No.: 14/285,936

(22) Filed: May 23, 2014

(65) Prior Publication Data

US 2014/0347880 A1 Nov. 27, 2014

(30) Foreign Application Priority Data

May 27, 2013 (TW) .............................. 102118570 A

(51) Int. Cl.
*F21V 8/00* (2006.01)

(52) U.S. Cl.
CPC ............ *G02B 6/0073* (2013.01); *G02B 6/0061* (2013.01); *G02B 6/0065* (2013.01); *G02B 6/0068* (2013.01); *G02B 6/0036* (2013.01); *G02B 6/0038* (2013.01); *G02B 6/0043* (2013.01); *G02B 6/0046* (2013.01); *G02B 6/0055* (2013.01); *Y10T 29/49002* (2015.01)

(58) Field of Classification Search
CPC .......................... G02B 6/0065; G02B 6/0073
USPC ............................................ 362/612, 84, 606
See application file for complete search history.

(56) References Cited

U.S. PATENT DOCUMENTS

| | | | | |
|---|---|---|---|---|
| 5,513,290 | A * | 4/1996 | Ishikawa et al. | 385/49 |
| 6,730,533 | B2 * | 5/2004 | Durocher et al. | 438/26 |
| 7,591,580 | B2 * | 9/2009 | Maeda et al. | 362/625 |
| 8,038,308 | B2 * | 10/2011 | Greiner | 362/84 |
| 2007/0242474 | A1 * | 10/2007 | Kim | 362/601 |
| 2009/0162628 | A1 * | 6/2009 | Kurokawa et al. | 428/220 |
| 2011/0260646 | A1 * | 10/2011 | Moon et al. | 315/294 |
| 2012/0001203 | A1 * | 1/2012 | Wang et al. | 257/88 |
| 2012/0281166 | A1 * | 11/2012 | Iwasaki | 349/65 |

* cited by examiner

*Primary Examiner* — Sharon Payne
(74) *Attorney, Agent, or Firm* — IPR Works, LLC

(57) ABSTRACT

A LED light bar, a related planar light source and a method of manufacturing such light bar is provided. The light source includes a light guide plate having a first surface and a second surface; at least one light bar, on which a plurality of LEDs is disposed, wherein the light bar is disposed on a lateral side of the light guide plate, and the LEDs are disposed inside the light guide plate to output light; a reflector, which is disposed outside the second surface and reflects light; and a diffuser, which is disposed outside the first surface and scatters reflected light of the reflector. Because LEDs are pre-disposed in a mold when the light guide plate is manufactured, the LEDs and the light guide plate are integrally formed, the loss of light can be avoided, and the efficiency of the planar light source can be enhanced.

16 Claims, 17 Drawing Sheets

LIGHT-EMITTING-DIODE LIGHT BAR AND RELATED PLANAR LIGHT SOURCE

BACKGROUND OF THE INVENTION

1. Field of the Invention

The invention relates to a light source module, and more particularly to a planar light source and a method of manufacturing such planar light source.

2. Related Art

At present, in an edge-lighting planar light source module having light-emitting diodes (LEDs) serving as a light source, a plurality of LEDs is mounted on a substrate body. FIGS. 1a and 1b are a side view and a top view, respectively, showing an embodiment adopting a light guide plate. Referring to FIGS. 1a and 1b, the edge-lighting light source module includes a light guide plate 2 and a plurality of LEDs 10. The light guide plate is typically formed by acrylic by way of injection molding. A diffusion plate 22 and a reflective plate 24 are disposed above and below the light guide plate 2, respectively. The substrate body is a light bar 12. The LED 10 is disposed on one side of the light bar 12. Then, a light-emitting surface of the light bar 12 is aligned with a light input surface 20 of the light guide plate 2. The light, after being reflected by the reflector 24, scatters from the diffuser 22 and is converted into the uniform surface light source.

FIGS. 2a and 2b are a front view and a top view, respectively, showing another conventional light source module, in which a planar light guide plate 4 is adopted, and two light bars 12 and LEDs 10 are disposed on two sides of the planar light guide plate 4.

The light bar is usually a strip-like substrate body, on which a positive pole electroconductive track and a negative pole electroconductive track are formed or disposed. When the light bar is being manufactured, packaged LEDs are sequentially disposed on the strip-like substrate body, and the positive and negative pole ends of each packaged LED are electrically connected to the positive and negative pole electroconductive tracks of the strip-like substrate body, respectively.

In the LED package, the LED chip is usually bonded to the lead frame containing the housing, and the electrodes are led out of the lead frame by way of metal wire bonding, and then the organic resin, such as silicone gel or epoxy resin, containing fluorescent powders are coated to form the package body.

In order to make the light source module obtain the uniform brightness, a material having the refractive index different from that of the acrylic plate is usually printed on the surface of the light guide plate, or refracting surfaces with different angles are directly formed on the surface of the light guide plate. FIGS. 3a to 5b are front views and top views, respectively, showing three conventional edge-lighting light source modules. In FIGS. 3a and 3b, an ink layer 30 composed of the transparent resin and containing light scattering particles is formed on the second surface 18 of the light guide plate 2. In FIGS. 4a and 4b, a plurality of rough blocks 40 is formed on the second surface 18 of the light guide plate 2 so that the second surface 18 becomes the concave-convex surface. In FIGS. 5a and 5b, a plurality of dents 50 is formed on the second surface 18 of the light guide plate 2 so that the second surface 18 becomes the sawtooth surface. The three examples make the light uniform by increasing the reflecting or scattering area. However, the efficiency of the existing art is directly proportional to the thickness of the light input surface 20 of the light guide plate and the machining smoothness of the mirror of the light input surface 20. Under the considerations of the cost, weight and thickness, the efficiency often has to be sacrificed to obtain the balance among various aspects. In addition, the difference between the refractive indexes of the LED package body and the air causes the total reflection, and the separation of the light source from the light guide plate loses the light to decrease the illumination.

In addition, due to the thickness restriction of the light guide plate and the convenience of manufacturing the light bar, the current edge-lighting light source module usually adopts the surface mounted device (SMD) LEDs with the lower power. This kind of LED usually has the poor light-emitting efficiency and heat dissipating effect due to the external shape and the structure restriction, and the high current driving cannot be used. So, many LEDs are required, and the overall efficiency of the light source module is poor and the complicated manufacturing processes are caused. Although the edge-lighting planar light source module has the advantages of the thinned structure, and the soft and uniform high quality light source, the cost is too high. In addition to the application to the backlight module of the liquid crystal display, the edge-lighting planar light source module is not popular in the ordinary illumination market.

Therefore, the invention provides a LED light bar and related planar light source and a method of manufacturing the same to overcome the problems. The embodied architecture and implementation will be described in the following.

SUMMARY OF THE INVENTION

A main object of the invention is to provide a planar light source, in which LEDs and a light guide plate are integrally formed, wherein the light almost can completely enter the light guide plate to significantly enhance the efficiency of the planar light source.

Another object of the invention is to provide a method of manufacturing a planar light source, wherein the LEDs are disposed on lateral sides of molds, and then a concoction capable of polymerizing into the light guide plate is poured so that the LEDs and the light guide plate are integrally formed.

Still another object of the invention is to provide a LED light bar, which can be easily mounted in the molds when being integrally formed with the light guide plate, can rapidly conduct the heat generated by the LED, can be free of the length restriction and can have the extremely low manufacturing cost.

To achieve the above-identified objects, the invention provides a LED light bar and a related planar light source, which includes a light guide plate, at least one LED light bar, a reflector and a diffuser. The light guide plate has a first surface and a second surface. The light bar is disposed on a lateral side of the light guide plate, on which a plurality of LEDs is disposed. The LEDs are disposed in the light guide plate and output light. The reflector is disposed outside the second surface and reflects the light. The diffuser is disposed outside the first surface and scatters the reflected light of the reflector into the uniform surface light source.

The invention further provides a method of manufacturing a light guide plate in the planar light source. The method includes the steps of: mounting a plurality of LEDs on at least one light bar, and placing the light bar on lateral sides of an upper mold and a lower mold; concocting a plurality of materials, comprising methyl methacrylate and a polymerization initiator, into a concoction and pre-polymerizing and slurrying the concoction; combining the upper mold and the lower mold into a complete mold, and pouring the slurried concoction into the mold; polymerizing the concoction in the mold by heat treatment; and de-molding to form a light guide plate.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1A:
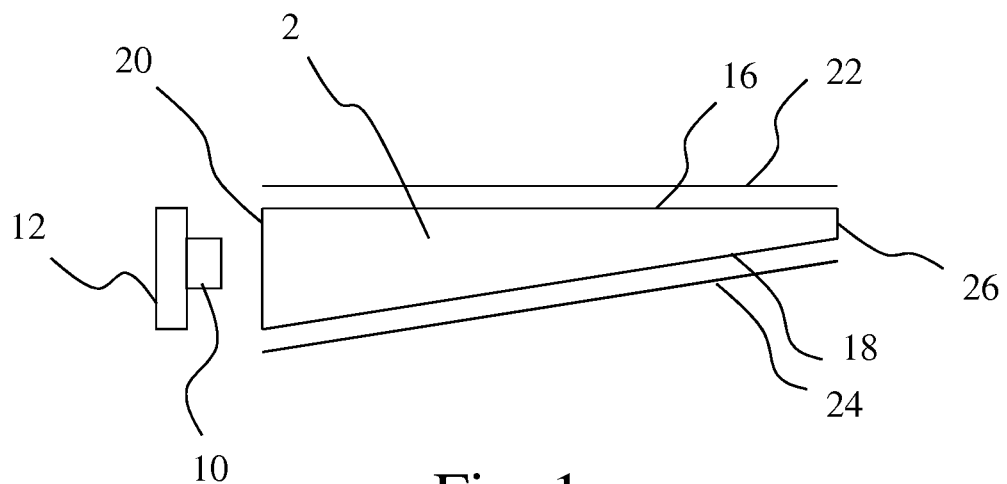
FIGS. 1a and 1b are a front view and a top view, respectively, showing a conventional light source module adopting a wedged light guide plate.
Figure 1B:
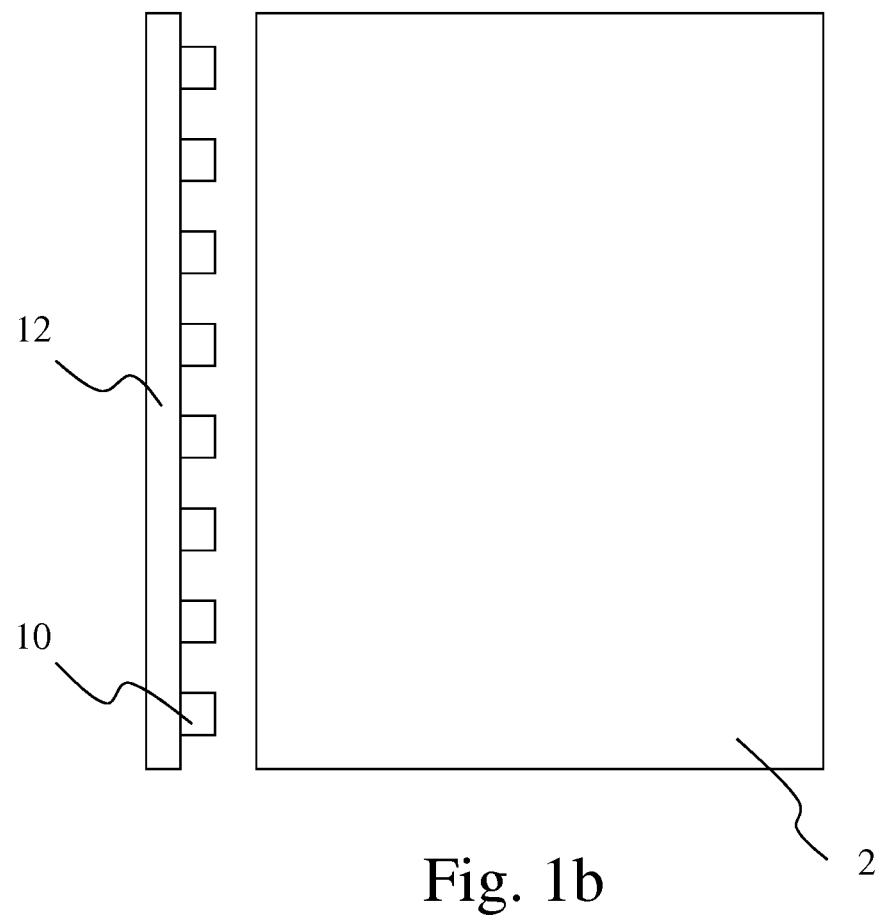
Figure 2A:
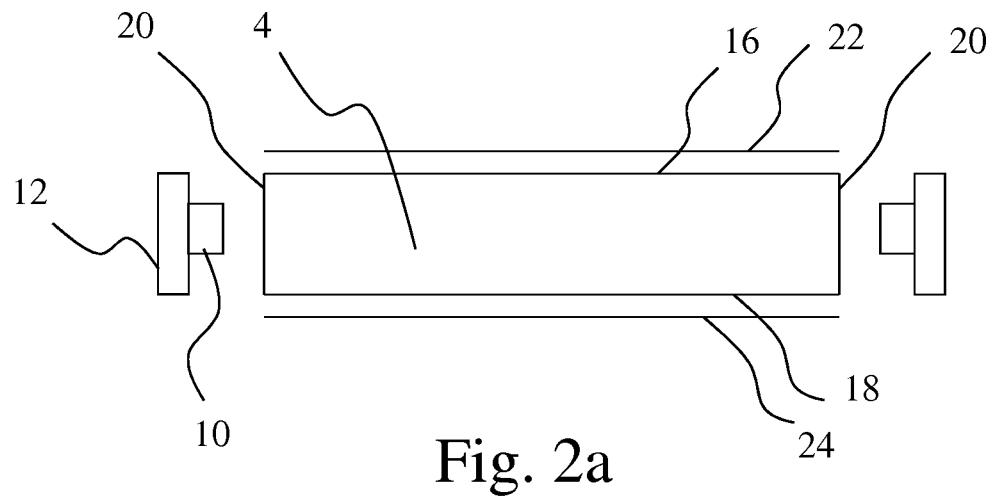
FIGS. 2a and 2b are a front view and a top view, respectively, showing a conventional light source module adopting a planar light guide plate.
Figure 2B:
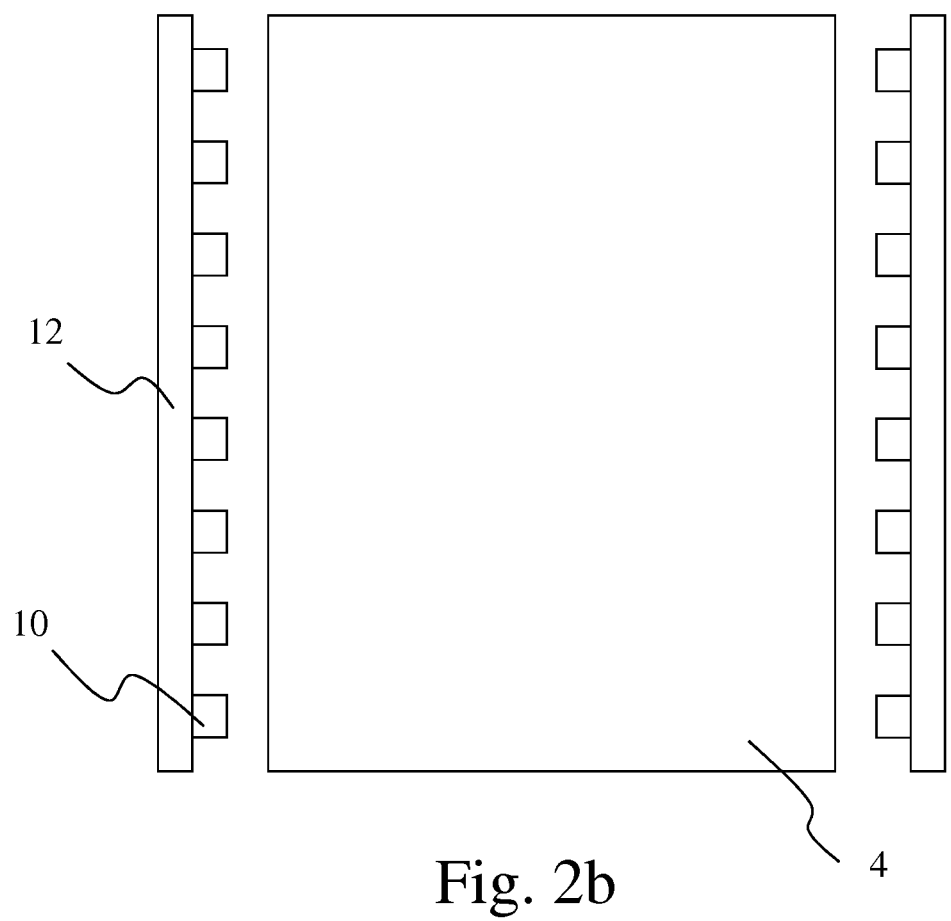
Figure 3A:
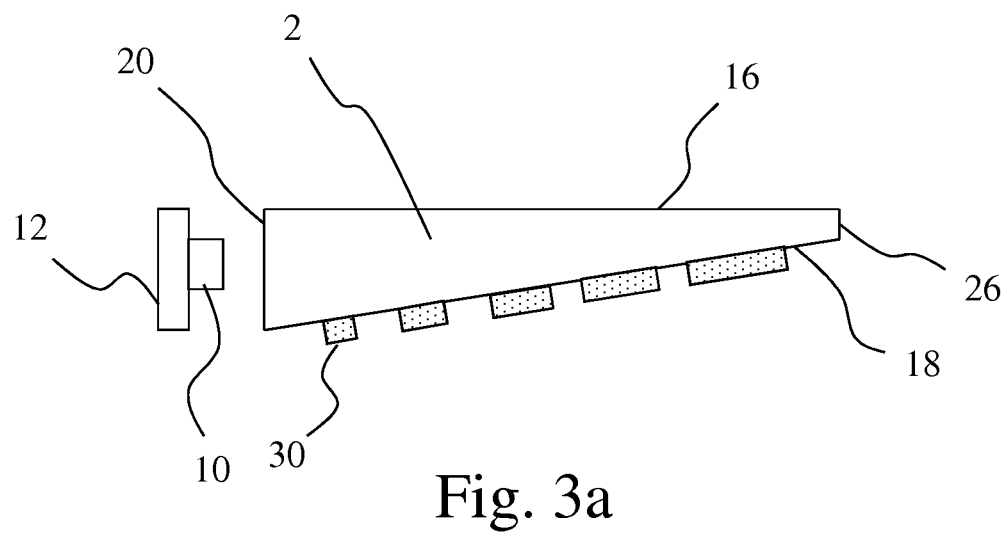
FIGS. 3a and 3b are a front view and a top view, respectively, showing a conventional light source module adopting a wedged light guide plate, on which an ink layer is disposed.
Figure 3B:
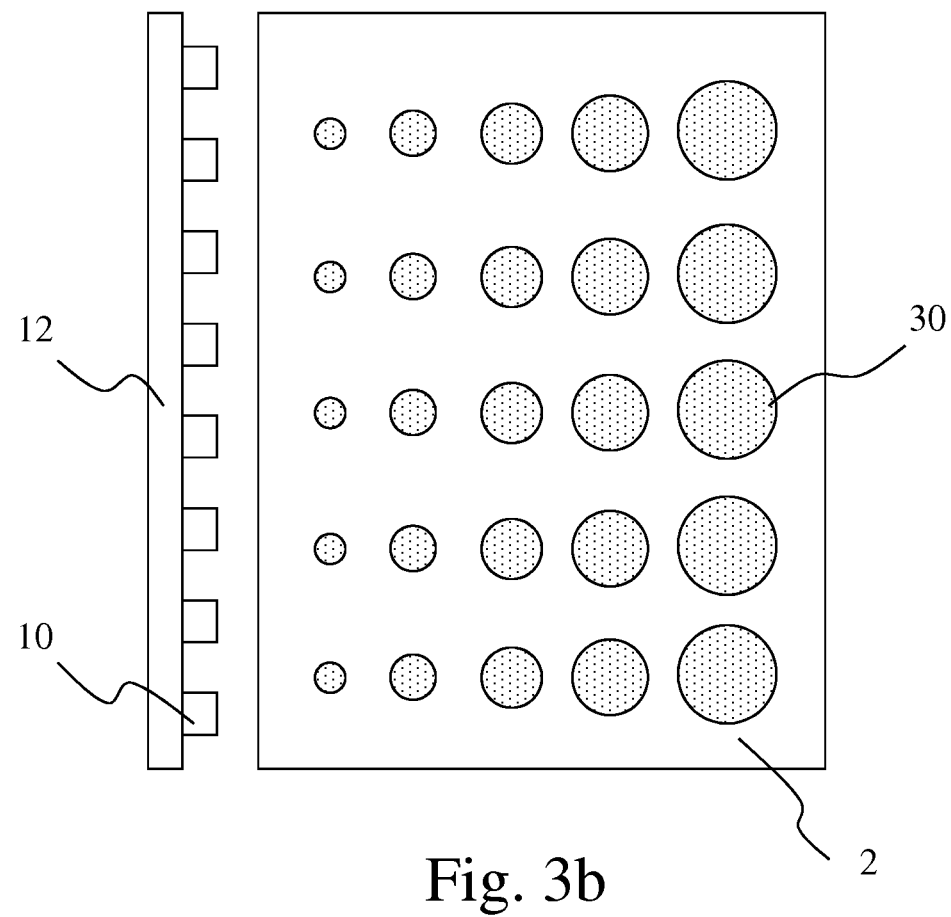
Figure 4A:
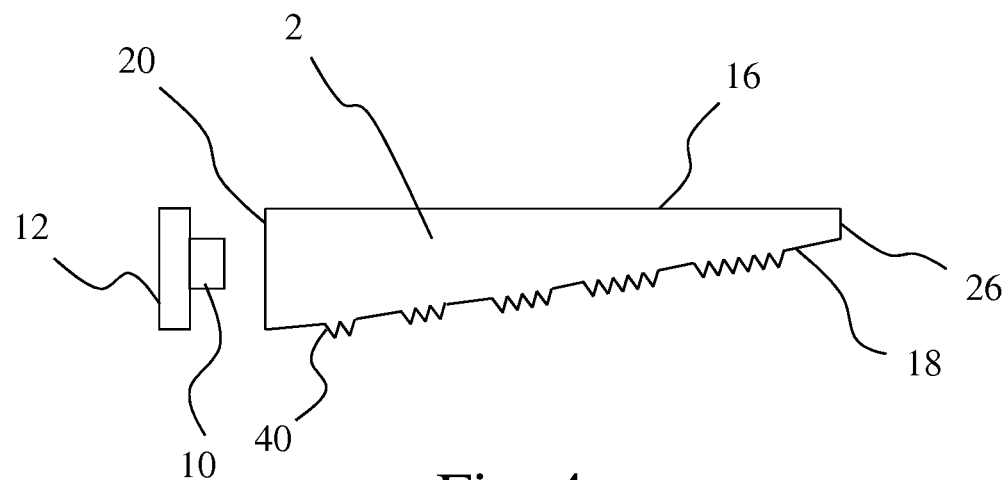
FIGS. 4a and 4b are a front view and a top view, respectively, showing a conventional light source module adopting a wedged light guide plate on which a rough block is disposed.
Figure 4B:
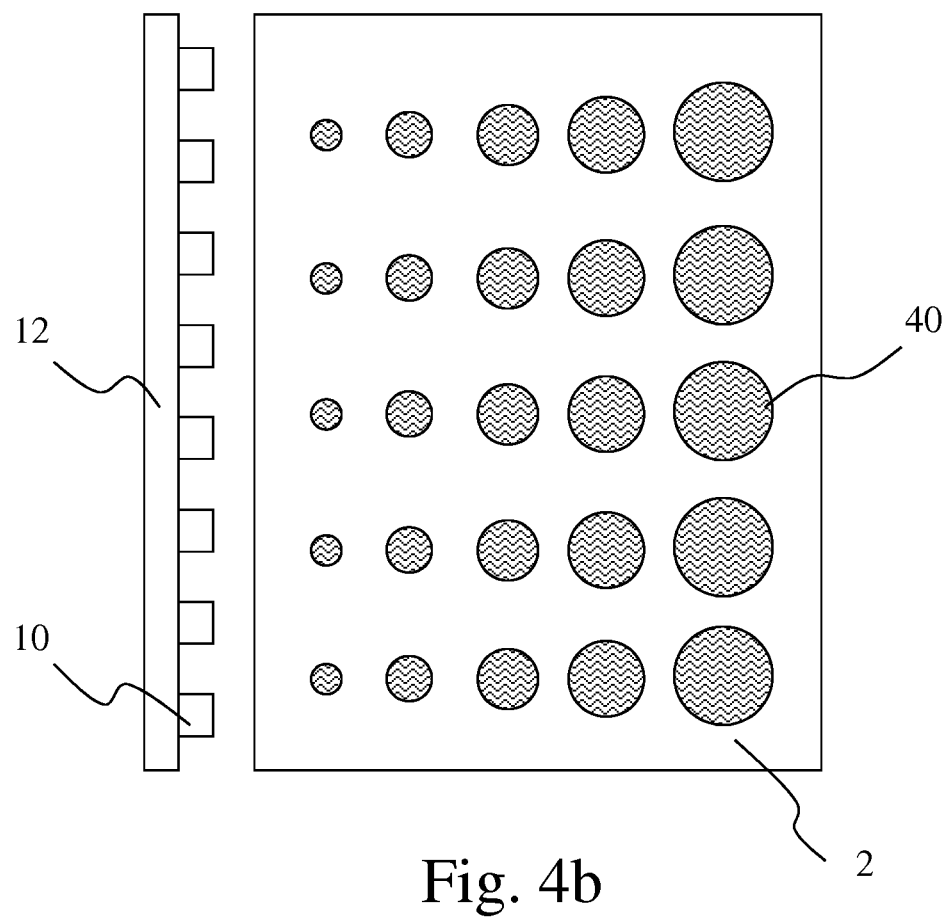
Figure 5A:
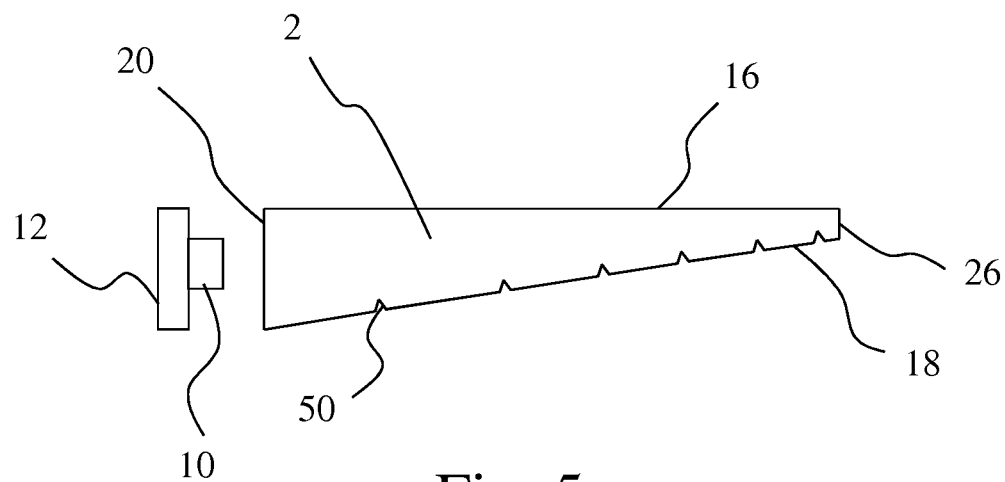
FIGS. 5a and 5b are a front view and a top view, respectively, showing a conventional light source module, in which a wedged light guide plate formed with dents is adopted.
Figure 5B:
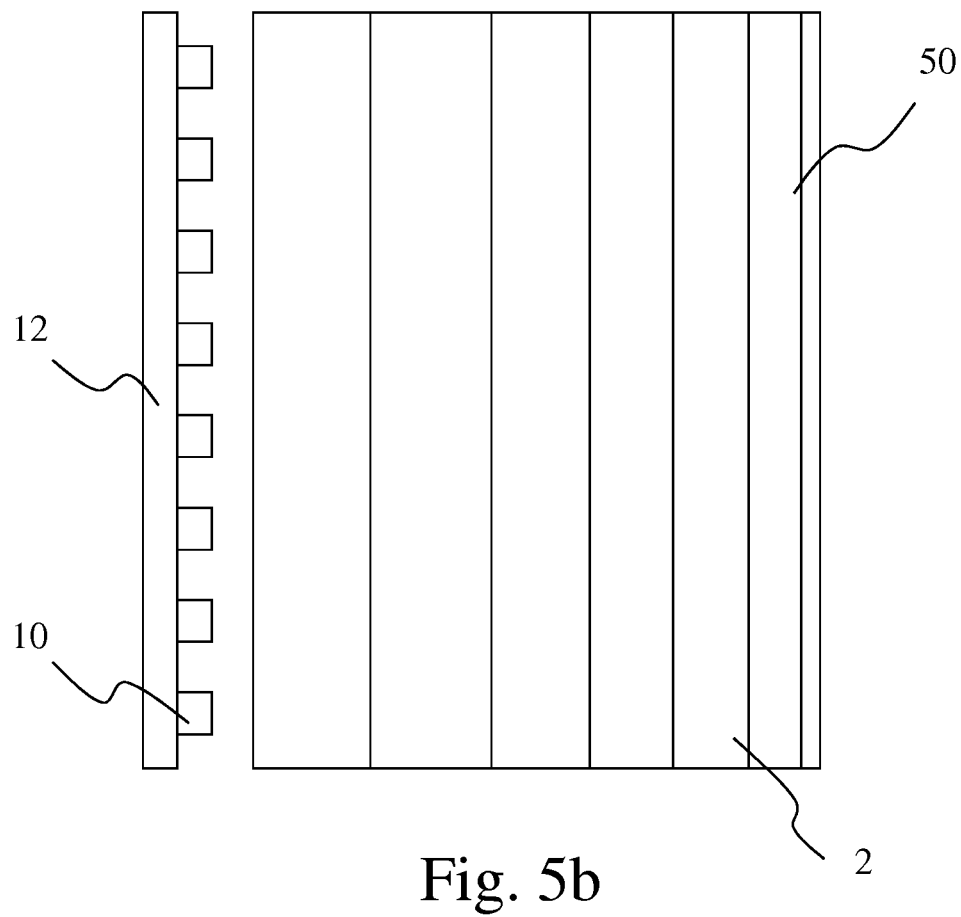
Figure 6A:
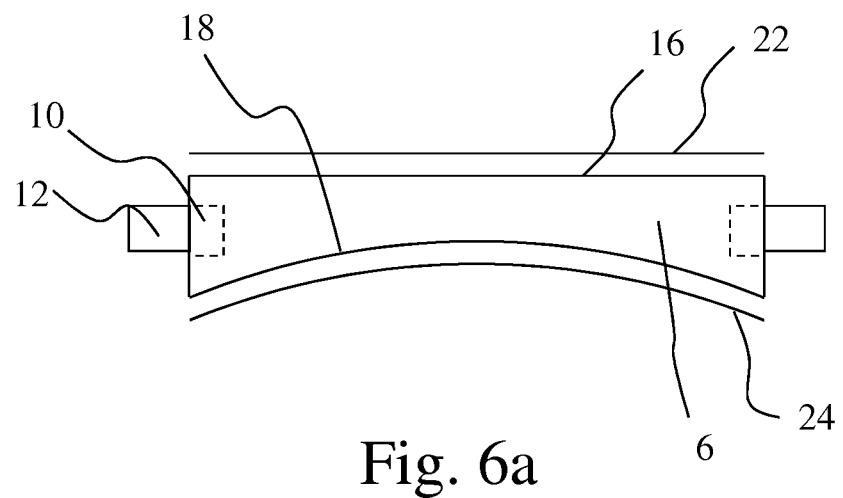
FIGS. 6a and 6b are a front view and a top view, respectively, showing a light source module of the invention adopting a concave light guide plate, in which LEDs are disposed.
Figure 6B:
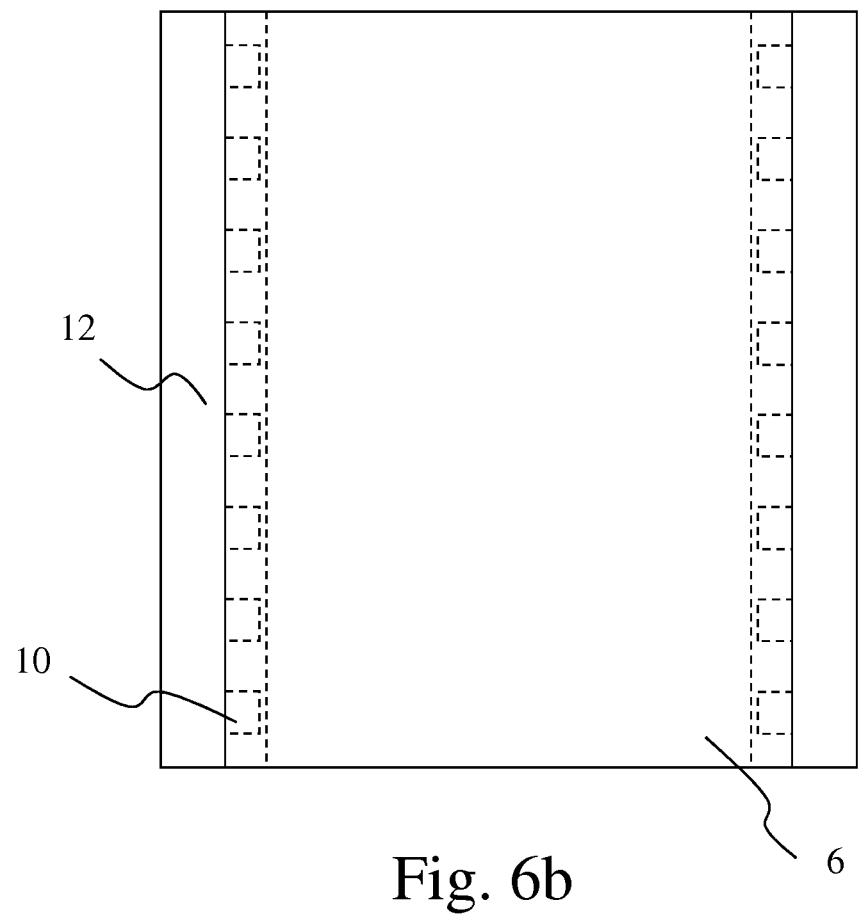

The invention provides a LED light bar and related planar light source and manufacturing method, wherein LEDs are placed inside a light guide plate. FIGS. 6a and 6b are a front view and a top view, respectively, showing an embodiment of the invention, which includes a concave light guide plate 6, at least one light bar 12, a reflector 24 and a diffuser 22. The concave light guide plate 6 may be a transparent acrylic plate having a first surface 16 and a second surface 18 on top and bottom, respectively. The diffuser 22 is disposed outside the first surface 16, and the reflector 24 is disposed outside the second surface 18. The light bars 12 are disposed on two sides of the concave light guide plate 6. The light bar 12 has a plurality of LEDs 10, and the LEDs 10 are disposed in the concave light guide plate 6 to output light. The reflector 24 reflects light, and the diffuser 22 scatters the reflected light of the reflector 24 into a uniform surface light source.

In the embodiment of FIGS. 6a and 6b, the light guide plate is a concave light guide plate, the second surface 18 is a curved surface or camber concave toward the first surface 16, and the diffuser 22 and the second surface 18 have the same arc.

Figure 7A:
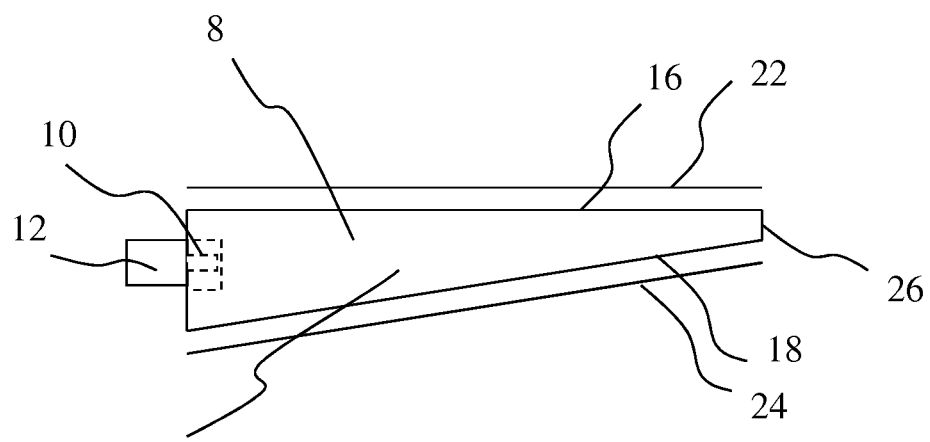
FIGS. 7a and 7b are a front view and a top view, respectively, showing a light source module of the invention adopting a wedged light guide plate, in which LEDs are disposed.
Figure 7B:
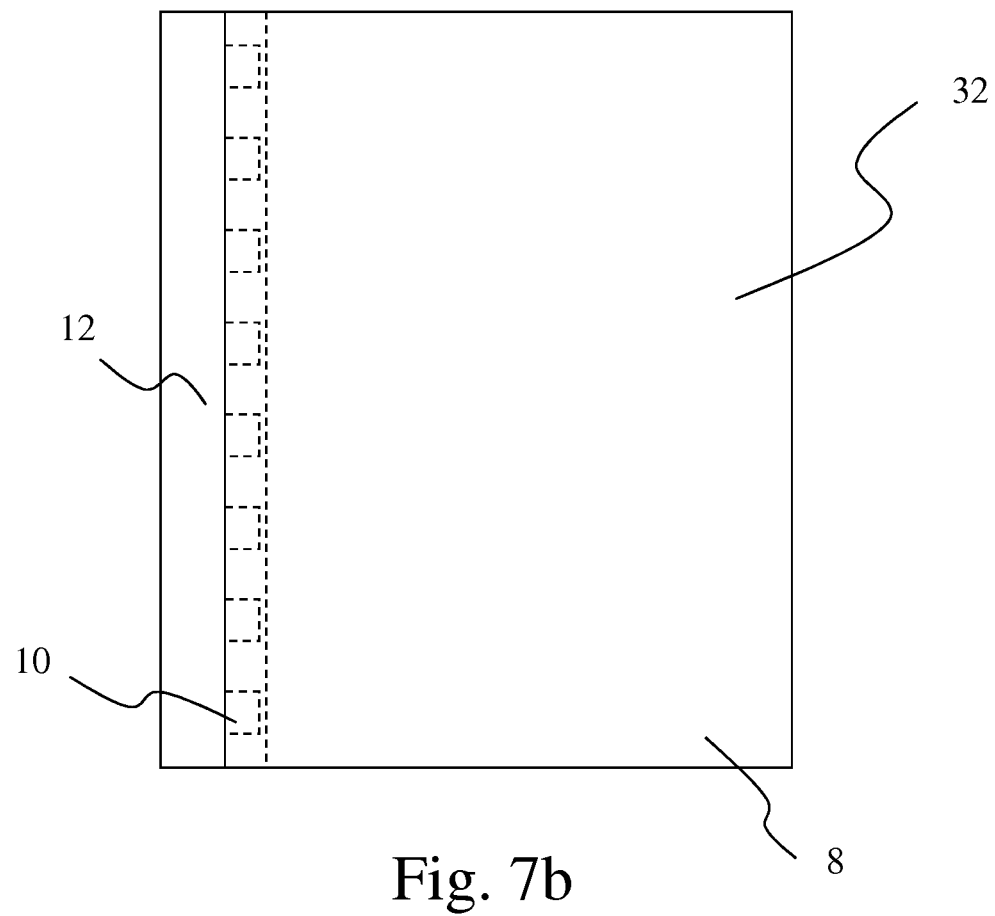

FIGS. 7a and 7b are a front view and a top view, respectively, showing another embodiment of the invention, which is different from the embodiment of FIGS. 6a and 6b in that the light guide plate is a wedged light guide plate 8, that there is only one light bar 12, that the end of the wedged light guide plate 8 with the light bar 12 is thicker, and that the end without the light bar 12 is a thin edge 26. Similarly, the LEDs 10 are disposed inside the wedged light guide plate 8, the reflector 24 reflects the output light of the LED 10 to the first surface 16, and the reflected light is scattered out from the diffuser 22.

Figure 8A:
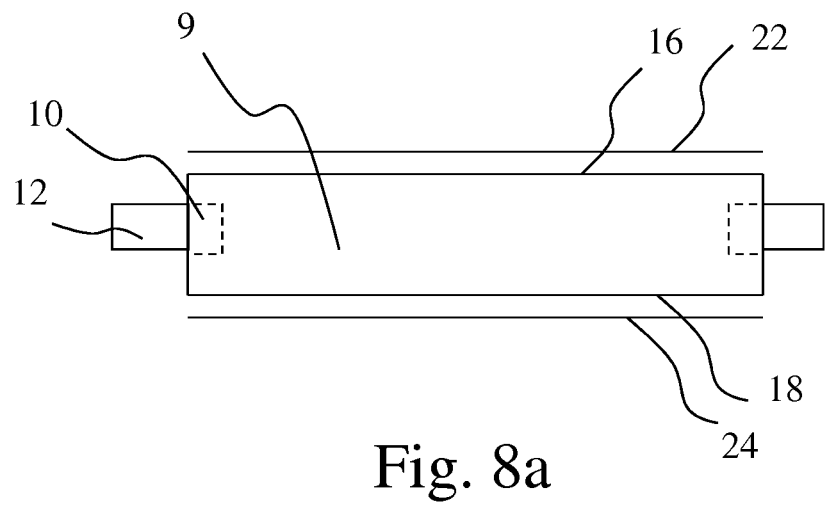
FIGS. 8a and 8b are a front view and a top view, respectively, showing a light source module of the invention adopting a planar light guide plate, in which LEDs are disposed.
Figure 8B:
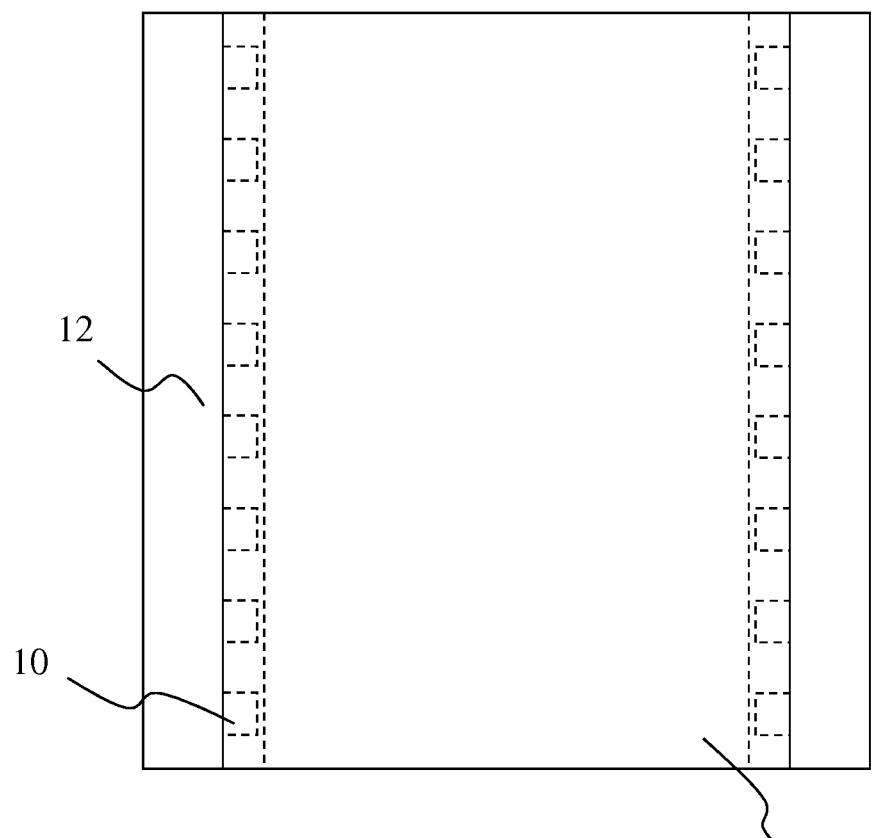

FIGS. 8a and 8b are a front view and a top view, respectively, showing still another embodiment of the invention, which is different from the embodiment of FIGS. 6a and 6b in that the light guide plate is a planar light guide plate 9, that the first surface 16 and the second surface 18 are two parallel flat surfaces, and that the light bars 12 and the LEDs 10 are disposed on both sides of the planar light guide plate 9. Similarly, the LEDs 10 are disposed inside the planar light guide plate 9, the reflector 24 reflects the output light of the LED 10 to the first surface 16, and the reflected light is scattered out from the diffuser 22.

Figure 9A:
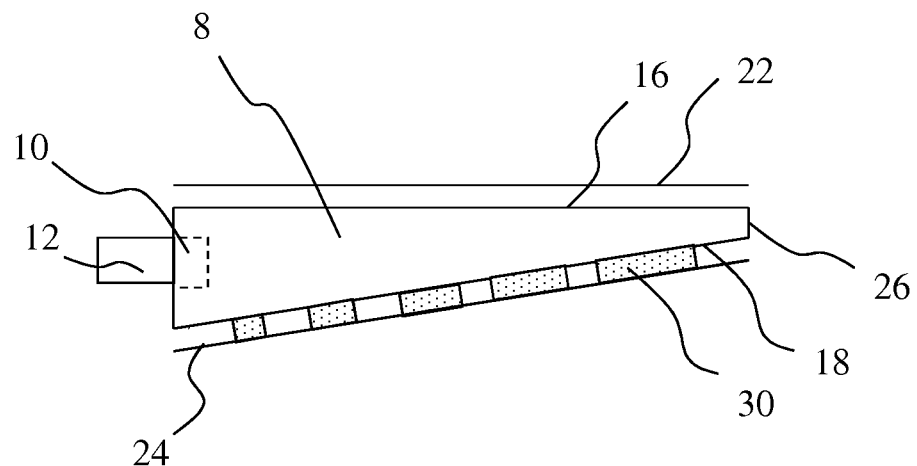
FIGS. 9a and 9b are a front view and a top view, respectively, showing a light source module according to one embodiment of the invention, wherein LEDs are disposed in the light guide plate on which an ink layer is disposed.
Figure 9B:
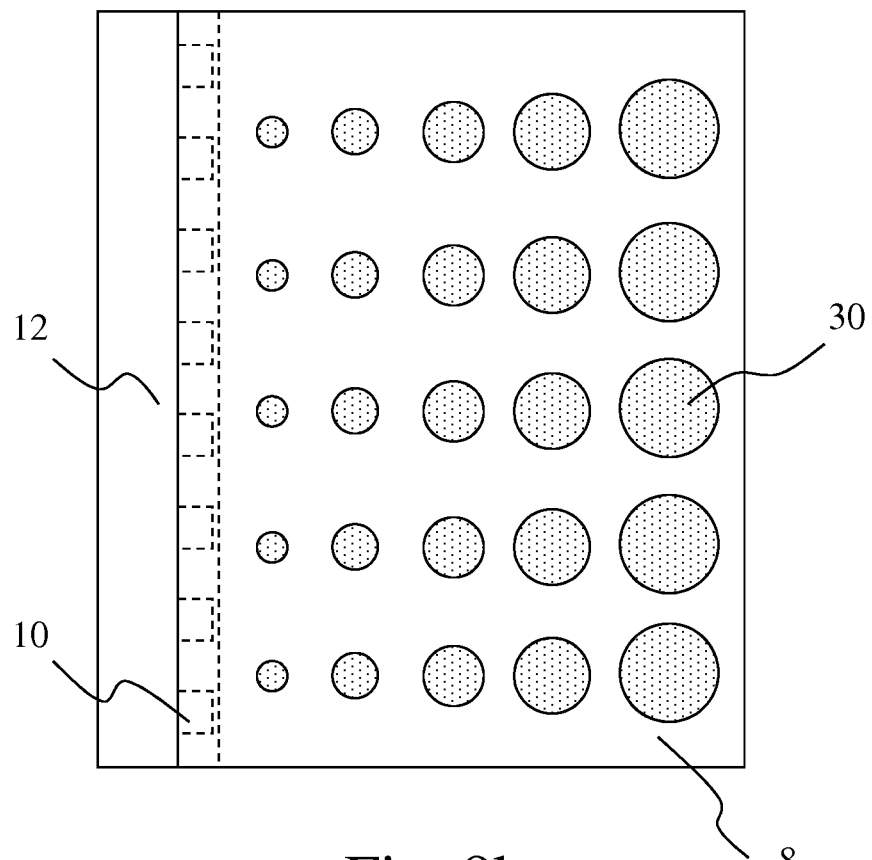
Figure 10A:
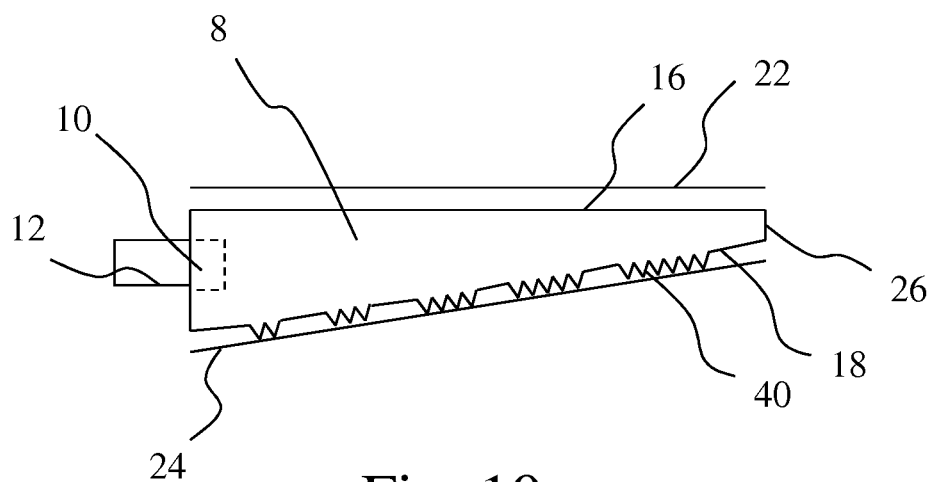
FIGS. 10a and 10b are a front view and a top view, respectively, showing a light source module according to one embodiment of the invention, wherein LEDs are disposed in the light guide plate, on which rough blocks are disposed.
Figure 10B:
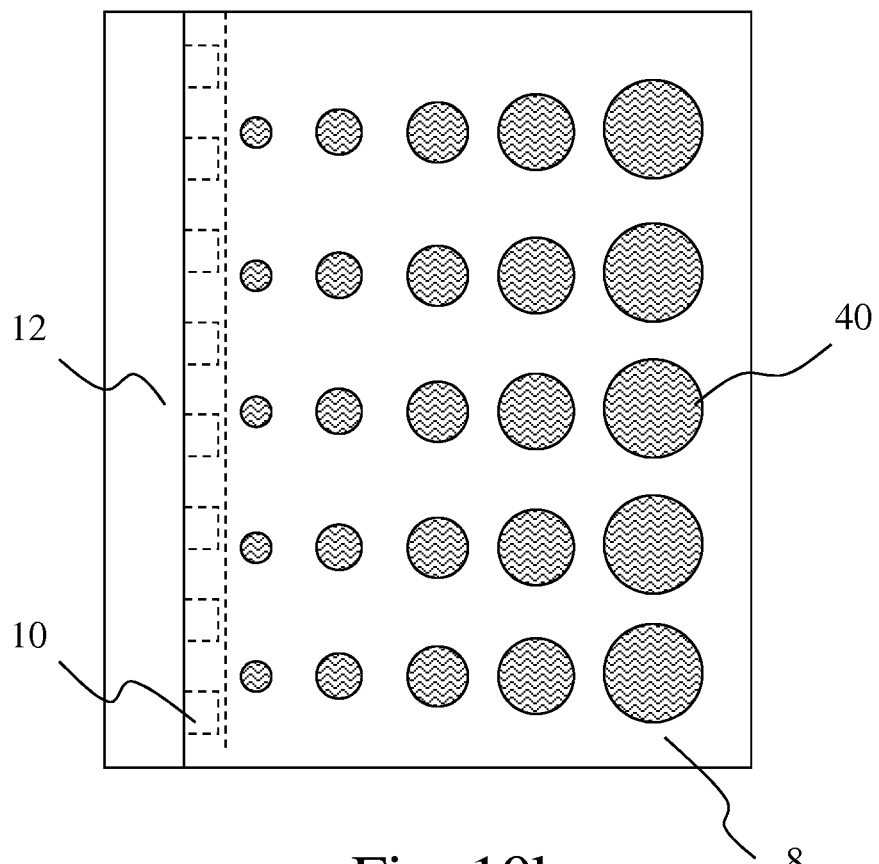
Figure 11A:
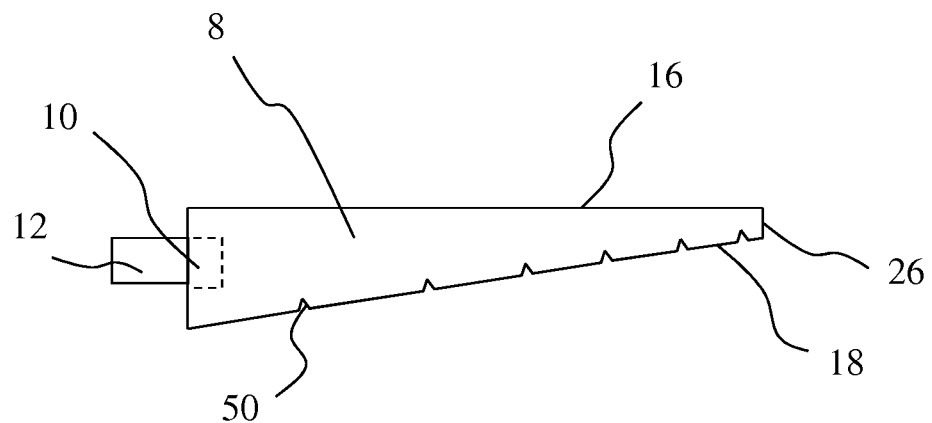
FIGS. 11a and 11b are a front view and a top view, respectively, showing a light source module according to one embodiment of the invention, wherein LEDs are disposed in the light guide plate, on which dents are disposed.
Figure 11B:
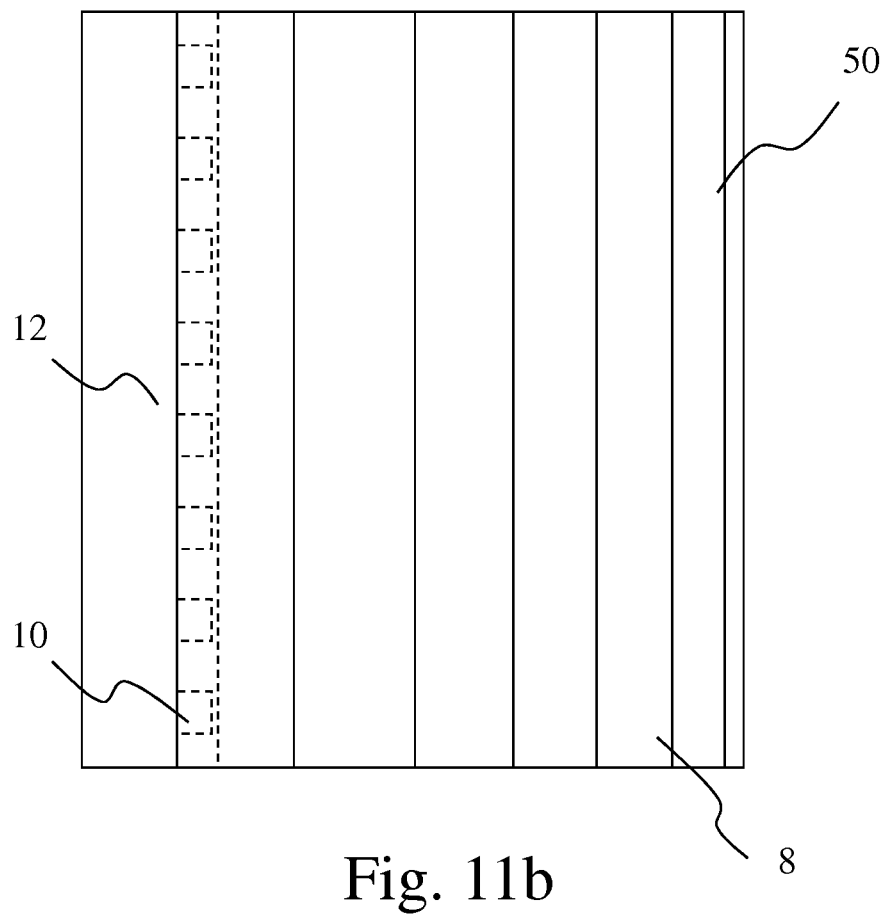

FIGS. 9a, 10a and 11a are front views showing three other embodiments of the invention, in which the configuration capable of enlarging the reflective surface area is disposed on the second surface of the light guide plate, so that the light becomes more uniform and has the higher brightness. Referring to FIGS. 9a and 9b, a wedged light guide plate serves as an example, and the second surface 18 of the wedged light guide plate 8 is formed with a plurality of blocks containing light scattering particles, and an ink layer 30 composed of transparent resin. The light scattering particles can make the light become more uniform. In FIGS. 10a and 10b, the wedged light guide plate also serves as an example, wherein a plurality of rough blocks 40 is formed on the second surface 18 of the wedged light guide plate 8, or a rough surface is directly formed on the second surface 18, so that the second surface 18 becomes a concave-convex surface to enlarge the reflective surface area. FIGS. 11a and 11b also utilize the wedged light guide plate as an example, in which a plurality of dents 50 is formed on the second surface 18 of the wedged light guide plate 8 so that the second surface 18 becomes a sawtooth surface to enlarge the reflective surface area, enhance the light homogenizing effect, and provide the sufficient brightness after scattering.

According to the above-mentioned embodiments, the invention provides a proprietary LED light bar, which includes a substrate body 28, a plurality of LED chips 14, package bodies 72 containing fluorescent powders and metal bonding wires 80.

Figure 12A:
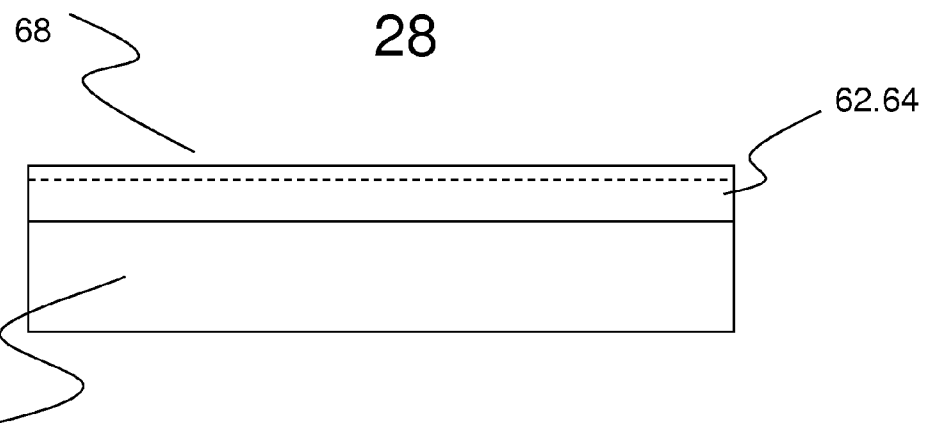
FIGS. 12a, 12b and 12c are a front view, a top view and a side view, respectively, showing a substrate body of a LED light bar according to one embodiment of the invention.
Figure 12B:
Figure 12C:
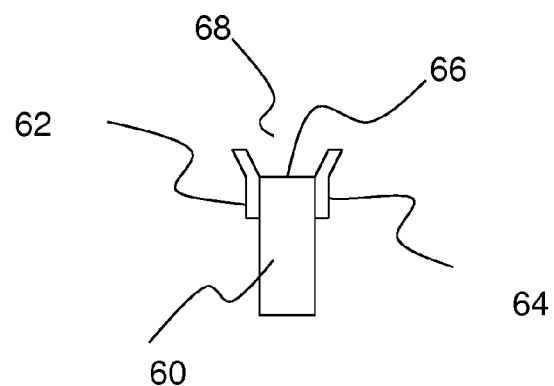

FIGS. 12a, 12b and 12c are a front view, a top view and a side view, respectively, showing the substrate body 28 of a LED light bar according to one embodiment of the invention. The light bar substrate body 28 includes three isometric metal plates, which include a middle metal plate 60, a left metal plate 62 and a right metal plate 64, adhered together, wherein the three metal plates are electrically insulated from one another. An end surface of each of the three metal plates is a light output surface 68. The middle metal plate 60 is thicker and wider. A middle metal plate end surface 66 of the light output surface 68 of the middle metal plate 60 is a substrate connected to a plurality of LED chips 14 and the package bodies 72 containing fluorescent powders, and is formed by aluminum plated with silver or copper plated with silver to rapidly conduct the heat generated by the LEDs. The left metal plate 62 and the right metal plate 64 are thinner and narrower than the middle metal plate 60, are electroconductive tracks of the positive poles and the negative poles of the LEDs, and are preferably made of the material of copper plated with silver.

Figure 13A:
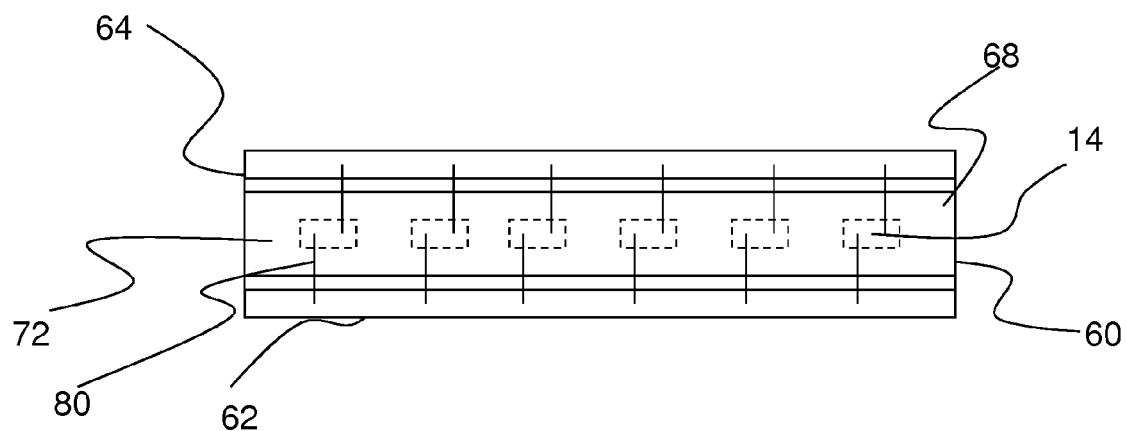
FIGS. 13a and 13b are a top view and a side view, respectively, showing a LED light bar according to one embodiment of the invention.
Figure 13B:
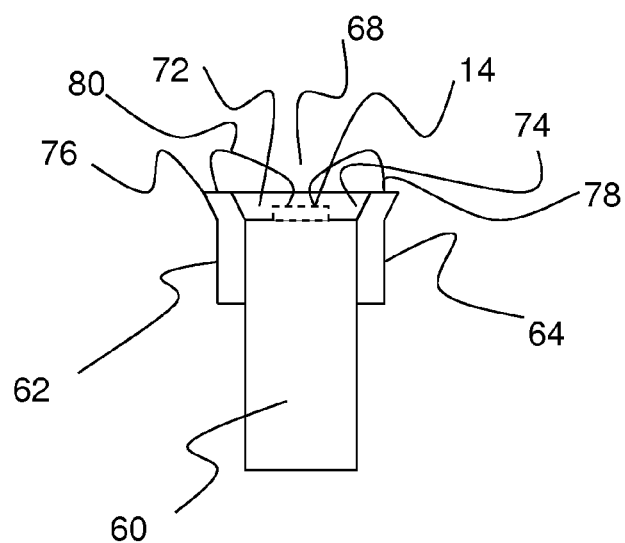

FIGS. 13a and 13b are a top view and a side view, respectively, showing the LED light bar of the embodiment, wherein a LED chip 14 is directly bonded to the middle metal plate end surface 66, and the left metal plate 62 and the right metal plate 64 slightly project over the middle metal plate 60 to form projections, which tilt outwardly at a fixed angle. Its inner side surfaces 74 have package bodies 72 containing fluorescent powders and are the light reflecting layers of the LED chips 14. The left metal plate end surface 76 and the right metal plate end surface 78 are electric connection points of the metal bonding wires 80 led out from the positive poles and the negative poles of the LED chips 14.

Figure 14A:
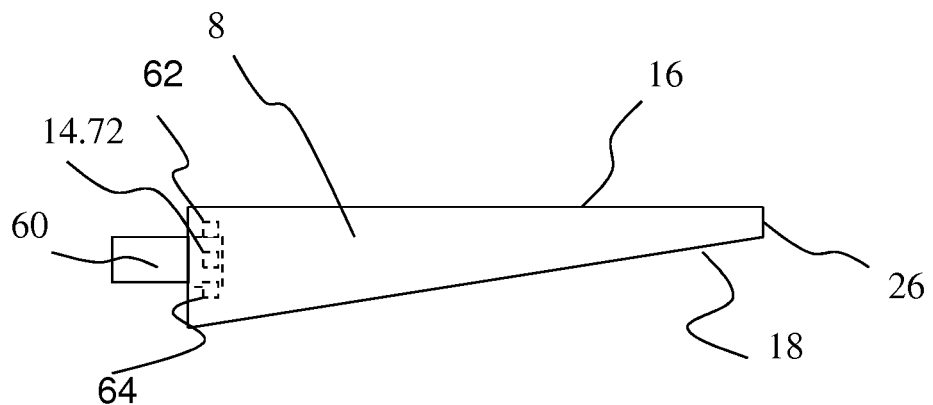
FIGS. 14a and 14b are a top view and a side view, respectively, showing that a LED light bar and a light guide plate are integrally formed according to one embodiment of the invention.
Figure 14B:
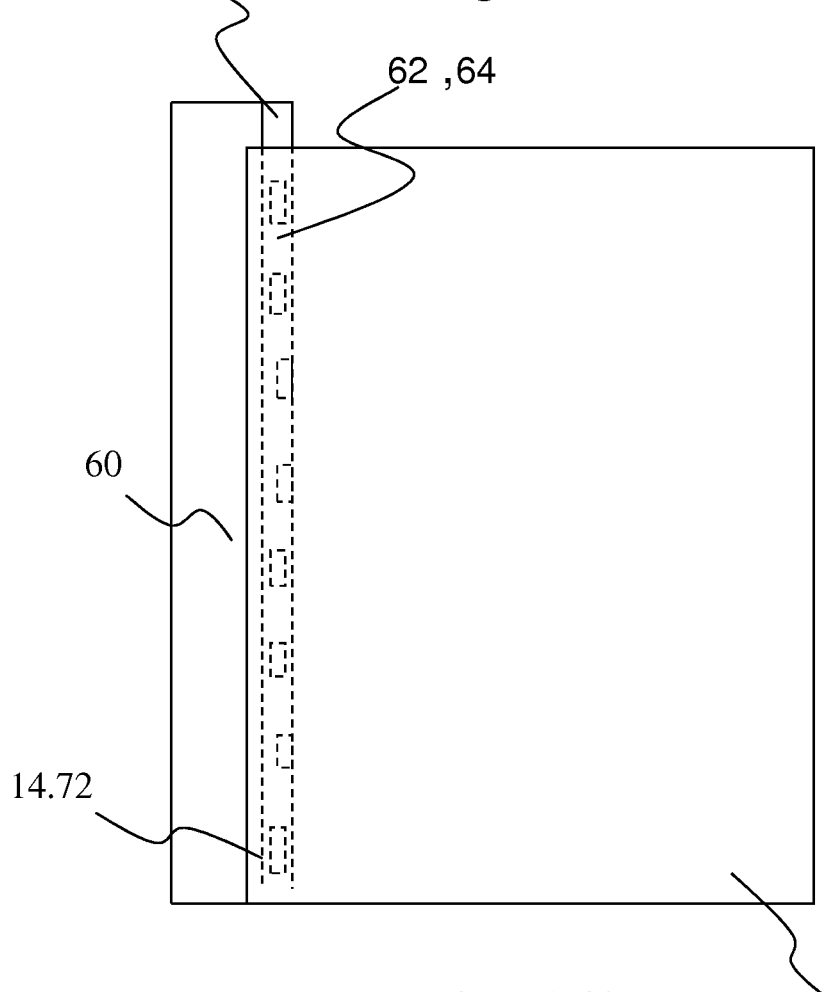

FIGS. 14a and 14b are a front view and a top view, respectively, showing that the LED light bar 12 and the light guide plate 8 are integrally formed according to the embodiment of the invention. The front end of the middle metal plate 60 of the light bar has a plurality of LED chips 14 and the light output surface 68 of the package bodies 72 containing fluorescent powders is disposed inside the light guide plate 8. The back end of the middle metal plate 60 is disposed outside the lateral side of the light guide plate 8 to serve as a LED heat sink or to be externally connected to a heat sink terminal. Regarding the left metal plate 62 and the right metal plate 64 of the electroconductive tracks of the positive and negative poles, the top portions thereof are disposed outside the light guide plate 8 and serve as power connection points 70, and the other portions are disposed inside the light guide plate 8 to isolate the external environment from affecting the LEDs.

Figure 15A:
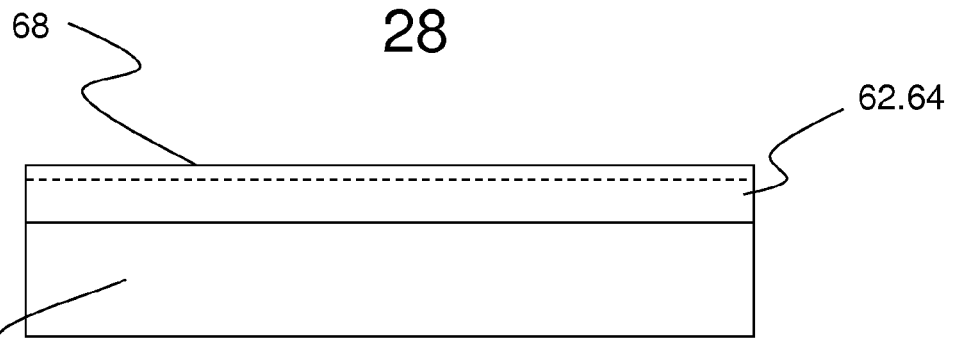
FIGS. 15a, 15b and 15c are a front view, a top view and a side view, respectively, showing a substrate body of LEDs according to another embodiment of the invention.
Figure 15B:
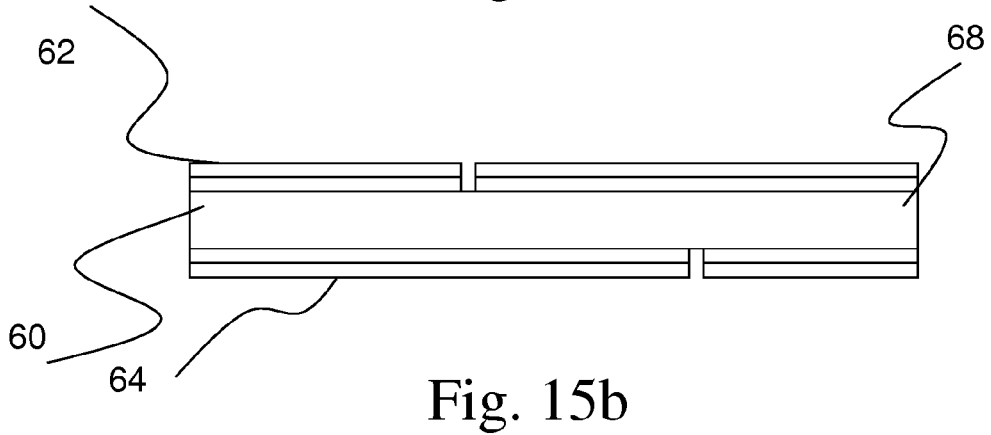
Figure 15C:
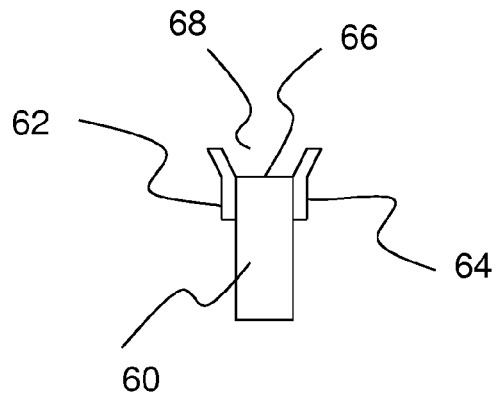

FIGS. 15a, 15b and 15c are a front view, a top view and a side view, respectively, showing a substrate body 28 of a LED light bar according to another embodiment of the invention. This embodiment differs from the embodiment of FIGS. 12a, 12b and 12c in that the left metal plate 62 and the right metal plate 64 are discontinuous to provide different serial and parallel electrical connection options for the LEDs.

Figure 16A:
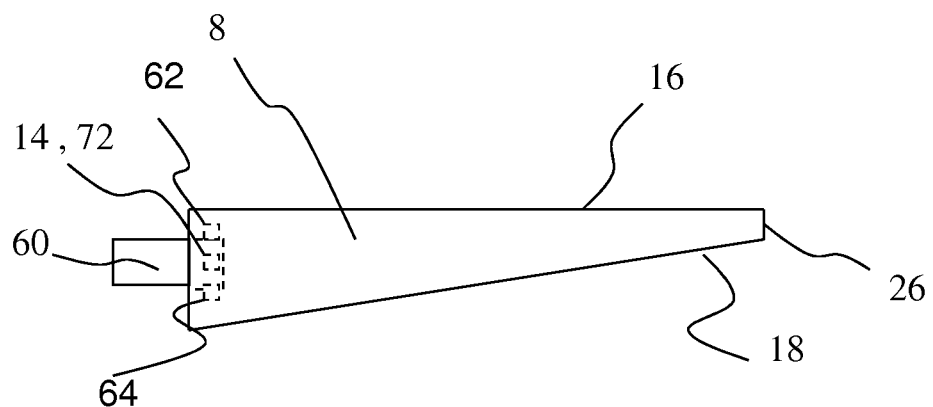
FIGS. 16a and 16b are a front view and a top view, respectively, showing that LEDs and a light guide plate are integrally formed according to another embodiment of the invention.
Figure 16B:
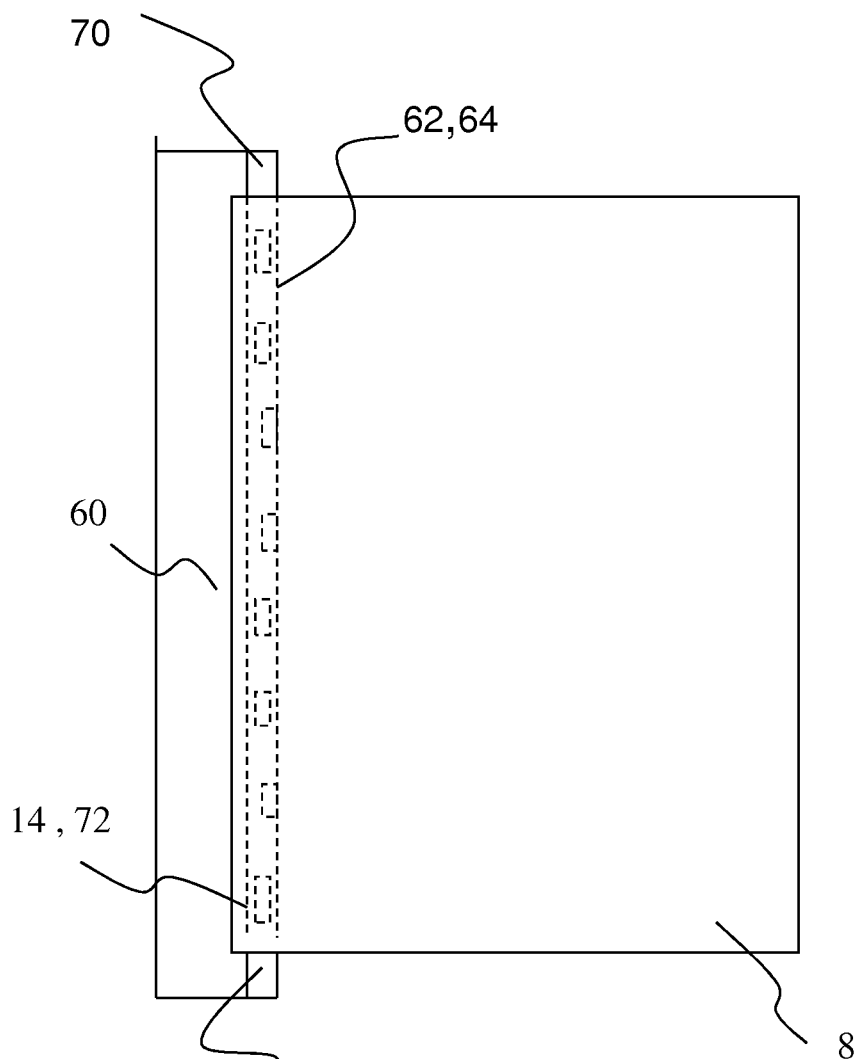

FIGS. 16a and 16b are a front view and a top view, respectively, showing that the LED light bar 12 and the light guide plate 8 are integrally formed according to another embodiment of the invention. This embodiment differs from the embodiment of FIGS. 14a and 14b in that the power connection points 70 of the electroconductive tracks of the positive and negative poles are disposed on two ends of the light guide plate 8.

To sum up, the LED light bar of the invention has the conciseness structure and the sufficient mechanical strength, and can be easily mounted in the molds when being integrally formed with the light guide plate, so that the stable shape, dimension and optical performance can be obtained after shaping.

The planar light source of the invention may function as the planar light source for illumination as well as the backlight module of the liquid crystal display.

Figure 17:
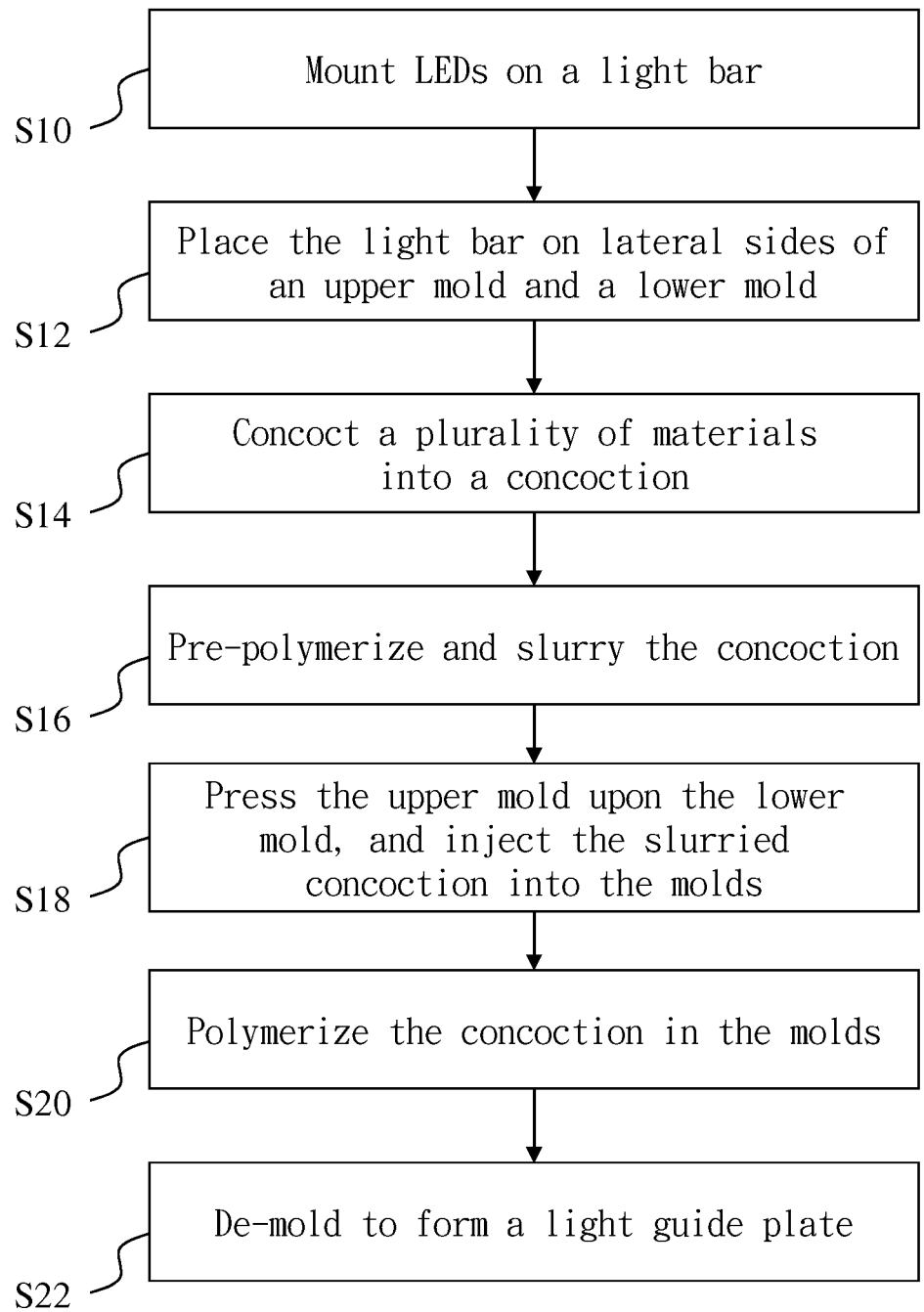
FIG. 17 is a flow chart showing a method of manufacturing a planar light source of the invention.

FIG. 17 is a flow chart showing a method of manufacturing the light guide plate of the LED light bar and related planar light source of the invention. First, a plurality of LED chips is disposed or mounted on the middle metal plate end surface of at least one light bar substrate body. Then, the positive and negative pole ends of the LED chips are electrically connected to positive and negative pole electroconductive tracks of the light bar substrate body in series or parallel by way of wire bonding according to the circuit requirement. Next, package bodies containing fluorescent powders are coated to complete the step S10 for assembling the LEDs on the light bar. Then, in step S12, the light bar is placed on lateral sides of an upper mold and a lower mold. According to the shapes of the molds, different numbers of light bars may be placed. For example, the wedged light guide plate only has a light bar, but the concave light guide plate and the planar light guide plate have two light bars. In step S14, a plurality of materials is concocted into a concoction, wherein the materials include methacrylate and a polymerization initiator. In step S16, the concoction is pre-polymerized, wherein the monomers of the concoct are preliminarily polymerized. The heat treatment can be applied, and then the concoction is slurried. In step S18, the upper mold and the lower mold are assembled into a complete mold, and the slurried concoction is injected into the molds to perform a mold injecting step. In step S20, the heat treatment polymerizes the concoction in the molds, and this step needs the heat treatment to increase the polymerizing speed and effect. Finally, the de-molding is performed to form a light guide plate integrally formed with the LEDs, as shown in step S22.

Because the casting polymerization is to make the fluid methyl methacrylate (MMA) polymerized into the solid acrylic (PMMA) after several hours, and the working temperature is below 110° C. and the pressure is extremely low, the light bar mounted with the LEDs can be pre-disposed between the upper and lower molds. The light guide plate integrally formed with the LEDs can be obtained according to the flow chart of FIG. 17.

In summary, in the LED light bar and related planar light source and manufacturing method of the invention, the LEDs are pre-disposed in the molds, so that the light guide plate integrally formed with the LEDs can be formed, and the light can almost completely enter the light guide plate, thereby significantly enhancing the efficiency of the planar light source. In addition, the invention directly bonds the LED chip to the light bar without the lead frame thermal resistance, and the heat generated by the LEDs can be rapidly conducted and dissipated through the middle metal plate of the light bar of the invention. So, the working temperature of the LED can be effectively decreased, and the light-emitting efficiency and the lifetime can be increased.

In addition, the substrate body of the LED light bar of the invention only needs to be simply plated, adhered and bent and can be transformed from the rolled original material. So, no length restriction is present, and the continuity still can be held in the subsequent LED chip placement, bonding, wire-bonding, package body coating processes until the light bar product is obtained. So, Compared with the prior art, the invention has the significant progresses in the light-emitting efficiency, lifetime, material cost, manufacturing cost, apparatus investment and the production efficiency.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A planar light source, comprising:
   a light guide plate having a lateral side, a first surface and a second surface;
   at least one light bar, on which a plurality of LEDs is disposed, wherein the light bar is disposed on the lateral side of the light guide plate, and the LEDs are disposed inside the light guide plate and for outputting light;
   a reflector, which is disposed outside the second surface and reflects light; and
   a diffuser, which is disposed outside the first surface and scatters reflected light of the reflector,
   wherein the light bar comprises a substrate body, the LED chips, package bodies containing fluorescent powders, and metal bonding wires,
   wherein the substrate body comprises a middle metal plate, a left metal plate and a right metal plate, the left metal plate and the right metal plate are respectively adhered on two side surfaces of the middle metal plate, and the three metal plates are electrically insulated from one another,
   wherein the left metal plate and the right metal plate slightly project over the middle metal plate to form projections, and the projections tilt outwardly at a fixed angle and have inner side surfaces, the inner side surfaces of the projections of the left metal plate and the right metal plate and an end surface of the middle metal plate define a reflective cavity in which the package bodies containing the fluorescent powders are disposed, wherein the inner side surfaces of the projections of the left metal plate and the right metal plate and an end surface of the middle metal plate are light reflecting layers of the LED chips, and
   wherein the light guide plate is integrally formed with the LEDs.

2. The planar light source according to claim 1, wherein the light guide plate is a transparent acrylic plate.

3. The planar light source according to claim 1, wherein the substrate body is continuous and longitudinal.

4. The planar light source according to claim 3, wherein the LED chips are directly bonded to the light bar substrate body.

5. The planar light source according to claim 3, wherein the middle metal plate of the three metal plates is thicker and wider than the left metal plate and the right metal plate, and the end surface of the light output surface of the middle metal plate is bonded to the LED chips and the package bodies containing the fluorescent powders.

6. The planar light source according to claim 3, wherein the left metal plate and the right metal plate are thinner and narrower than the middle metal plate, and are electroconductive tracks of positive poles and negative poles of the LEDs, wherein the end surfaces of the light output surfaces are electric connection points of the metal bonding wires led out from the positive poles and the negative poles of the LED chips.

7. The planar light source according to claim 1, wherein the LED chips are disposed on the end surface connected between the two side surfaces of the middle metal plate, and the metal bonding wires are respectively connected to the projection of the left metal plate or the right metal plate.

8. The planar light source according to claim 3, wherein a portion of a front end of the middle metal plate, on which the LEDs are disposed, are disposed inside the light guide plate, and a back end of the middle metal plate is disposed outside a lateral side of the light guide plate, and serves as a heat sink of the LEDs or is externally connected to a heat sink terminal.

9. The planar light source according to claim 3, wherein a top portion of each of the left metal plate and the right metal plate is disposed outside the light guide plate to serve as a power connection point, and the other portion of each of the left metal plate and the right metal plate is disposed inside the light guide plate.

10. The planar light source according to claim 3, wherein the middle metal plate is composed of a metal material of aluminum plated with silver or copper plated with silver.

11. The planar light source according to claim 3, wherein the left metal plate and the right metal plate are composed of a metal material of copper plated with silver.

12. The planar light source according to claim 1, wherein the light guide plate is a concave light guide plate, the first surface is a flat surface, the light bars are disposed on two sides of the light guide plate, and the second surface is a curved surface or a camber concave toward the first surface.

13. The planar light source according to claim 1, wherein the light guide plate is a wedged light guide plate, and has one wider side, on which the light bar is disposed, and the other narrower side away from the light bar.

14. The planar light source according to claim 1, wherein the planar light source is parallel with the second surface, and the at least one light bar is disposed on at least one of two sides of the first surface.

15. A method of manufacturing the light guide plate of the planar light source according to claim 1, the method comprising the steps of:
   mounting the plurality of LEDs on the at least one light bar;
   placing the light bar on lateral sides of an upper mold and a lower mold;
   concocting a plurality of materials, comprising methacrylate and a polymerization initiator, into a concoction;
   pressing the upper mold upon the lower mold, and injecting the concoction into the upper and lower molds, so that the concoction polymerizes in the upper and lower molds by way of heat treatment; and
   de-molding to form the light guide plate.

16. The method according to claim 15, wherein the concoction is pre-polymerized and pre-slurried by way of the heat treatment.

* * * * *